March 1, 1966 J. M. VAN VLEET 3,237,485
METHOD OF TAP MANUFACTURE
Filed April 27, 1962
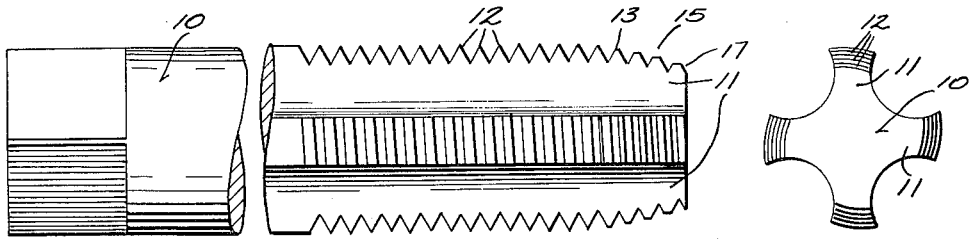
Fig. 1   Fig. 2
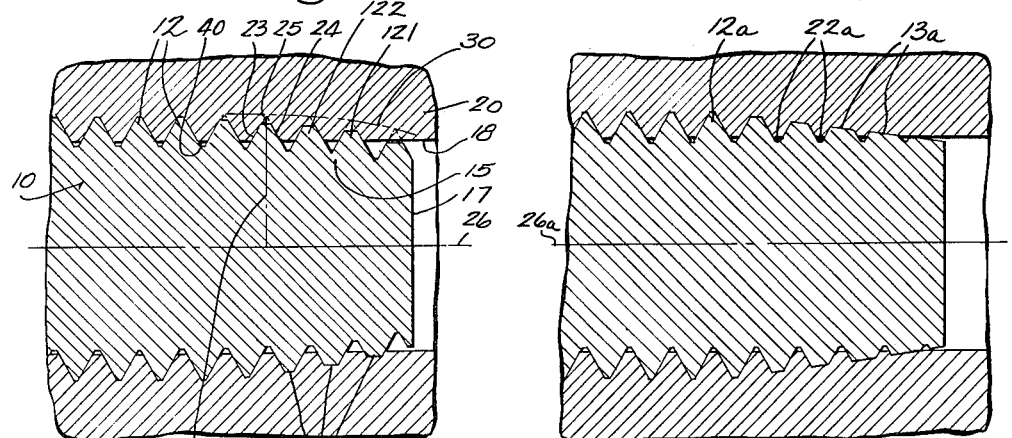
Fig. 3   Fig. 4 (PRIOR ART)
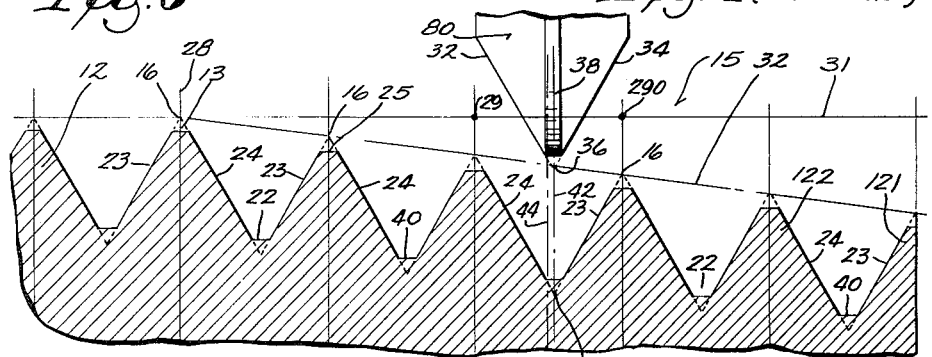
Fig. 5
Fig. 6
Fig. 7
INVENTOR.
JOHN M. VAN VLEET
BY
Wheeler, Wheeler & Wheeler
ATTORNEYS United States Patent Office 3,237,485
Patented Mar. 1, 1966

3,237,485
METHOD OF TAP MANUFACTURE
John M. Van Vleet, Hartland, Wis., assignor to Balax, Inc., North Lake, Wis., a corporation of Wisconsin
Filed Apr. 27, 1962, Ser. No. 190,610
5 Claims. (Cl. 76—101)

This invention relates to a tap and method of manufacture thereof. The present application is a companion to application Serial No. 190,609, filed April 27, 1962, entitled Thread Cutting Tap.

As in the companion application above identified, an object of the present invention is to provide a tap which will form successive sets of threads of identical size and finish, accuracy being achieved without the use of a lead screw and at greatly reduced thrust and torque.

The different species herewith disclosed include both thread cutting taps and thread swaging taps.

Not only are the present teeth symmetrical and geometrically in balance axially of the tap, but they have their theoretical apices located accurately on pitch. In the present application this result is achieved by a method which employs a male cutting or grinding tool as distinguished from the female cutting or grinding tool disclosed in the companion application above identified.

It is broadly immaterial what lead profile is used. I disclose as one embodiment of the invention a lead profile on an arc of large radius with successive teeth bodily offset radially. Another embodiment has an axially rectilinear lead tooth profile.

Because the crest of each individual tooth is located with precision on the pitch point of the thread dispite change of radius in the lead section, and because the flanks of the teeth are axially symmetrical with respect to the pitch point, the pressures to which the present tap is subject are balanced axially and the tap can be operated with greatly reduced torque and greatly improved accuracy. In previously known taps in which the pitch has been measured from crest to crest despite changes in radius; there is sufficient deviation from true pitch so that as the tap is withdrawn from the work the portions of the tap which are not truly on pitch damage the teeth formed in the completed work. This is not true of taps embodying the present invention.

In the drawings:

FIG. 1 is a fragmentary plan view of a thread cutting tap embodying the invention.

FIG. 2 is a view in end elevation of the tap shown in FIG. 1.

FIG. 3 is an enlarged fragmentary detail view in axial section through a piece of work in which a modified embodiment of my tap is engaged.

FIG. 4 is a view similar to FIG. 3 showing a piece of work in which a prior art tap is engaged, for purposes of comparison with FIG. 3.

FIG. 5 is a fragmentary detail view in section diagrammatically illustrating a step in a method of manufacturing a tap according to the present invention.

FIG. 6 is a view in plan on a reduced scale of a swaging tap comprising a species of the present invention.

FIG. 7 is a diagrammatic outline of the transverse profile of the tap of FIG. 6, it being noted that the view is not a true cross section but a diagrammatic showing of the profile.

While the invention is applicable both to male and to female taps, it is described, for convenience, from the standpoint of a male exemplification, it being understood that a female tap can readily be made according to the principles herein disclosed.

In the cutting tap shown in FIGS. 1 to 3 the body portion 10 is fluted to provide lands 11, each of which is provided with a row of thread cutting teeth 12. The crest 13 of each tooth is slightly rounded or flattened below its theoretical apex in a plane axially of the tap and transversely of the tooth. The theoretical apex is represented in FIG. 5 by the points 16 at which the sides or flanks intersect if extended beyond the rounded or flattened crests 13 of the actual teeth. In the illustrated embodiment the crest 13 is parallel to the axis in every axial plane.

In the lead portion 15 of the male tap selected to exemplify the invention, the overall diameter of the successive teeth conventionally increases progressively from the entering end 17 which is first introduced into the bore 18 of the workpiece 20. Either a rectilinear or a curved profile can readily be generated in accordance with the present invention. FIG. 3 shows the lead teeth in an axial profile having an overall curve on the arcuate profile 80. FIG. 5 shows the lead teeth in an axial profile which is rectilinear as indicated by the line marked 32.

FIG. 3 shows the lead portion of a tap embodying the present invention as compared with the showing in FIG. 4 of a prior art tap. In FIG. 3 at the left of the first full radius tooth 12, all teeth are of like radius both at their crests and their roots. To the right of the tooth 12 successive cutting teeth along the lands 11 are bodily displaced in radius toward the axis 26 so that not only their crests 13 and their theoretical apices 16, but their flanks 23, 24 and roots as well, are at progressively reduced radii, the grooves or valleys 22 between successive teeth being cut more deeply into the land portion of the tap as the teeth approach the leading end 17.

The crests 13 of all teeth are slightly reduced in radius below their theoretical apices 16. It is also true of the teeth at the right of tooth 12a in FIG. 4 that the crests 13a are short of the theoretical apices. However, in the conventional tap shown in FIG. 4 the grooves or valleys 22a between teeth are all at the same radius and the difference in overall radius of successive lead teeth is brought about by removing the outer portions of successive teeth to a depth determined by the desired profile. This greatly broadens the crests as clearly appears at the right in FIG. 4. Moreover, since these crests are made to conform to the desired profile, they are not merely broadened but are either oblique or axially arcuate with respect to the axis 26a of the tap (depending on whether the axial profile is rectilinear or arcuate). Consequently the prior art lead tooth is asymmetrical.

In contrast, each axial section of the flattened terminal face 25 of the tooth crest 13 of my improved tap (FIG. 3) is desirably in precise parallelism with axis 26 and at right angles to the pitch radius 28 (or curved on an arc balanced with respect to said radius).

Moreover, in the use of the improved tap shown in FIGS. 1 and 3, the cutting penetration of the first tooth 121 into the work is narrower than the ultimate width of the groove cut in the work at that radius. The second tooth 122 penetrates a little more deeply in a radial direction and also widens the groove slightly laterally of the cut. In my companion application I have shown the pattern of successive cuts whereby each successive lead tooth cuts from both sides and the bottom of the groove in the work to increase both width and depth dimensions of the valley between the teeth of the work by an amount which decreases progressively along the length of the lead portion of the tap.

As also pointed out in my companion application this is not true of the prior art tap shown in FIG. 4, wherein no successive tooth widens the cut previously made, metal being removed only from the bottom of the valley and not from the sides. Because of this difference, a tap according to the present invention gives much better chip control than is possible in a prior art tap.

The threads of my improved tap may be made in any appropriate manner. By way of illustration, I have shown the rotary abrasive tool 80 for making a thread by any grinding operation. For practical considerations the radially converging sides 32 and 34 of the tool 80 are not extended to the theoretical apex 36 but terminate at a cylindrical surface 38 with respect to which the frusto-conical sides 32 and 34 are concentric. The cylindrical peripheral surface 38 of the tool is, of course, concentric with the axis of rotation. In consequence of the surface 38, each valley 22 between successive teeth of the tap has a surface 40 which is parallel to tap axis 26 and centered with respect to a tap radius 42 which pass through the point 43 of intersection of flanks 23, 24 of the adjacent teeth.

In the cylindrical portion of the tap, the radius 42 upon which the center line of tool 32 approaches the axis 26 will coincide with the radius 44 which is midway between crest pitch points measured axially. In the lead portion of the tap (see FIG. 5) the radius 42 must be offset from the radius 44 by a distance such that the radius 42 will pass through said intersection 43 notwithstanding the decrease in radius of the shorter tooth crest.

In forming the teeth of a prior art tap such as is shown in FIG. 4, according to conventional prior art methods, the cutting or abrading tool would be operated on the radius shown at 44 in FIG. 5, such radius being midway the points 29 and 290 as measured axially on line 31 between the radii 28 through the theoretical pitch apices of the adjacent teeth. This would not produce axially balanced tap teeth having their apices on pitch. To produce the tooth contemplated by the present invention, it is necessary that the tool 80 be offset axially of the tap, as illustrated diagrammatically in FIG. 5. It will be observed that the tool is centered on the radius 42 which is not axially midway between the crests. However, the actual crests and flanks are on pitch and that is what is important. The offset of the tool is necessary because of the fact that the successive teeth in the lead section of the tap are at different radial distances from the axis. This offset of the cutting tool is, it may be noted, peculiar to the male type of tool shown at 80 as distinguished from the notched or female type tool disclosed in my companion application above identified. In the use of the latter, the technique is different. The crests preferably are widened progressively in the lead section as shown in FIG. 3.

The tap shown in FIG. 6 and FIG. 7 is of a different type, being a swaging type which operates by deforming the metal of the work rather than by removing it. The swaging tap differs from the cutting tap of FIGS. 1 to 3 in that it has no lands like those shown at 11 in FIG. 2. Its teeth 50 are not helically continuous, however, being interrupted by at least one axial channel at 52 for the relief of pressure of lubricant trapped in the hole which is being tapped. As this tap performs its swaging function, its tooth or teeth 50 will necessarily be in high pressure contact with the work and it would be impossible for lubricant in a blind hole to escape but for the provision of a vent. Instead of boring a hole centrally through the tap, it is preferred to provide the external channel 52 for vent purposes.

Whereas prior art swaging taps have teeth tips broad for strength, the fact that the teeth of the present tap are on pitch permits the teeth to be left sharper with narrower crests for a better swaging job. In practice the swaging tap crests are narrower in the lead section than in the body of the tap.

Moreover, although there are no lands in the sense of the structure best shown in FIG. 2, the teeth 50 are not of uniform radius. It is preferable to increase and decrease the radius at angular intervals as diagrammatically illustrated in FIG. 7. FIG. 7 shows four points 54 of maximum radius these being equally spaced at 90 degree intervals. Between these points of maximum radius, the teeth return to a minimum radius 56 which is continued in dotted lines at 58 merely for reference to show the increased radius at 54 as compared with the indicated minimum radius. It will be understood, of course, that this showing is necessarily diagrammatic because, at least in the lead section, the radius is changing on a spiral and it not a constant. Therefore, in fact, it would be true of the lead section 60 that the maximum radii are not alike but are progressively increased whereas in the section 62 the maximum radii are alike. It will further be understood that the number of angular points at which maximum radii are provided can be varied, it being preferred that these be in balance circumferentially of the tap. Thus it is desirable to have at least two points of maximum radius and the preferred number is three or four.

The teeth of the swaging tap shown in FIGS. 6 and 7 will be identical in cross section with the teeth of the cutting tap shown in FIGS. 1 to 3 and 5, to the extent that the crests will be precisely on pitch, the flanks will be symmetrical and geometrically in balance axially of the tap, the teeth in the lead section being progressively bodily offset radially instead of merely having their crests cut off at progressively lower radii from their theoretical apices. In fact the teeth of the swaging tap preferably have sharp crests. The swaging tap can be manufactured either with a female tool according to the techniques taught in the companion application above identified or with a male tool manipulated in accordance with the techniques taught in this application.

While reference has been made herein to successive teeth, it will be understood that this is in accordance with the conventional practice in the art based on the fact that as the tap is viewed the successive crest portions along the side of the tap look like separate teeth even though taps according to the present invention may, obviously, be designed to cut or swage a single tooth or multiple teeth, and the teeth of the tap may lie on a single helix or separate helices accordingly. As is well-known in the art, the forming tool used in practicing the method may be either a cutting tool, a grinding tool or a swaging tool. Since the method involves the way in which the tool is manipulated with regard to the tap body blank, it is broadly immaterial whether the tool functions by removing or displacing the metal of the blank.

I claim:

1. A method of making a tap body having teeth with like crests of progressively varying radius in a lead section and substantially constant radius in a body section, such method consisting in moving a male forming tool into the lead section of the tap body while effecting relative rotative and axial movement between the tool and the body upon lines corresponding to the spaces between teeth to be formed on the body, thereby to effect peripheral and progressively varying penetration thereof on a radius which is axially offset from a radius which is midway between the crests of successive teeth as measured axially, the offset being such that the crests of successive teeth in the lead section are exactly on pitch with the crests of teeth in the body section notwithstanding their variation in radius.

2. A method of forming a tap blank to make a tap having teeth with like crests in axial balance and of progressively differing radius in a lead section, such method consisting in forming teeth on the tap blank by effecting relative rotation, axial movement, and radial movement between the blank and a forming tool in directions to form in the lead section of the blank axially balanced teeth having flank portions converging to corresponding crests, and forming such teeth at progressively varying radii with the crests uniformly on pitch notwithstanding the variation in radius.

3. A method according to claim 2 in which the teeth are formed by the removal of metal from the tap blank between the desired teeth.

4. A method according to claim 2 in which the teeth are formed by swaging the metal of the tap blank to produce valleys between teeth.

5. A method according to claim 4 in which the swaging is varied in radius at angular intervals circumferentially of the tap, while nevertheless being held to substantially identical crest form in each axial section.

References Cited by the Examiner

UNITED STATES PATENTS

| | | | |
|---|---|---|---|
| 1,958,105 | 5/1934 | Koehler | 76—101 X |
| 2,288,574 | 6/1942 | Sadler | 76—101 |
| 2,330,099 | 9/1943 | Whyland | 10—141 |
| 2,390,950 | 12/1945 | Lanfranconi | 10—141 |
| 2,459,910 | 1/1949 | Alvin | 76—101 |
| 2,656,740 | 10/1953 | Bedker | 76—101 |

GRANVILLE Y. CUSTER, JR., *Primary Examiner.*

ANDREW R. JUHASZ, *Examiner.*